(12) United States Patent
Umino et al.

(10) Patent No.: US 9,512,330 B2
(45) Date of Patent: Dec. 6, 2016

(54) ACTINIC-RADIATION-CURABLE RESIN COMPOSITION, PRIMER CONTAINING THE SAME, AND SHAPED ARTICLE

(71) Applicant: DIC CORPORATION, Tokyo (JP)

(72) Inventors: Akio Umino, Ichihara (JP); Seiichi Uno, Ichihara (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/760,013

(22) PCT Filed: Jun. 17, 2014

(86) PCT No.: PCT/JP2014/065979
§ 371 (c)(1),
(2) Date: Jul. 9, 2015

(87) PCT Pub. No.: WO2015/001949
PCT Pub. Date: Jan. 8, 2015

(65) Prior Publication Data
US 2015/0361298 A1 Dec. 17, 2015

(30) Foreign Application Priority Data

Jul. 2, 2013 (JP) ................................. 2013-138832

(51) Int. Cl.
| | | |
|---|---|---|
| *C08F 2/46* | (2006.01) | |
| *C08G 61/04* | (2006.01) | |
| *C08G 18/42* | (2006.01) | |
| *B22F 1/00* | (2006.01) | |
| *C08L 77/00* | (2006.01) | |
| *C09D 173/00* | (2006.01) | |
| *C08F 290/06* | (2006.01) | |
| *C09D 5/00* | (2006.01) | |
| *C09D 167/08* | (2006.01) | |
| *C09D 133/08* | (2006.01) | |
| *C09D 133/14* | (2006.01) | |
| *C09D 179/02* | (2006.01) | |
| *C08F 220/32* | (2006.01) | |
| *C08F 222/10* | (2006.01) | |
| *C08F 220/28* | (2006.01) | |
| *C08F 220/34* | (2006.01) | |
| *C08L 61/28* | (2006.01) | |

(52) U.S. Cl.
CPC ............... *C09D 173/00* (2013.01); *C08F 2/46* (2013.01); *C08F 290/06* (2013.01); *C08F 290/061* (2013.01); *C09D 5/002* (2013.01); *C09D 133/08* (2013.01); *C09D 133/14* (2013.01); *C09D 167/08* (2013.01); *C09D 179/02* (2013.01); *C08F 220/32* (2013.01); *C08F 222/1006* (2013.01); *C08F 2220/283* (2013.01); *C08F 2220/343* (2013.01); *C08F 2222/104* (2013.01); *C08F 2222/1026* (2013.01); *C08F 2222/1053* (2013.01); *C08L 61/28* (2013.01)

(58) Field of Classification Search
CPC ... C09D 173/00; C09D 133/14; C09D 179/02; C09D 133/08; C09D 167/08; C08F 290/06; C08F 220/32; C08F 2220/283; C08F 2222/1026; C08F 2222/1053; C08F 2/46; C08F 222/1006; C08F 2220/343; C08F 2222/104
USPC ........ 522/170, 168, 1, 173, 182, 178; 520/1; 524/539, 500, 1, 600, 599
See application file for complete search history.

(56) References Cited

U.S. PATENT DOCUMENTS 5,780,526 A * 7/1998 Matsui ..................... C08J 7/047
522/101

FOREIGN PATENT DOCUMENTS

| JP | 62-151473 A | 7/1987 |
|---|---|---|
| JP | 9-309905 A | 12/1997 |
| JP | 2003-221408 A | 8/2003 |
| JP | 2006-70169 A | 3/2006 |
| JP | 2011-21153 A | 2/2011 |
| JP | 2012-067162 * | 4/2012 |
| JP | 2012-67162 A | 4/2012 |
| WO | 95/32250 A1 | 11/1995 |

OTHER PUBLICATIONS

Umino et al, JP 2012-067162 Machine Translation, Apr. 5, 2012.*
International Search Report dated Jul. 22, 2014, issued in corresponding application No. PCT/JP2014/065979 (2 pages).

* cited by examiner

*Primary Examiner* — Ling Choi
*Assistant Examiner* — Jessica E Whiteley
(74) *Attorney, Agent, or Firm* — Westerman, Hattori, Daniels & Adrian, LLP

(57) ABSTRACT

Provided are an actinic-radiation-curable resin composition that has high storage stability and that combines high levels of ease of application and adhesion to various substrates and high levels of coating appearance and heat resistance after curing, an actinic-radiation-curable primer for metallization that contains such an actinic-radiation-curable resin composition, and a shaped article including an undercoat layer for metallization that has good adhesion to various substrates. Specifically, an actinic-radiation-curable resin composition is provided that contains an oil-modified alkyd resin and a (meth)acryloyl-containing compound. The oil-modified alkyd resin is prepared using two or more oils having iodine values of 100 or more and has an oil length of 30 to 60, a mass average molecular weight of 200,000 to 1,000,000, and a molecular weight distribution (Mw/Mn) of 50 or more. Also provided is an actinic-radiation-curable primer for metallization that contains the actinic-radiation-curable resin composition.

9 Claims, No Drawings

ACTINIC-RADIATION-CURABLE RESIN COMPOSITION, PRIMER CONTAINING THE SAME, AND SHAPED ARTICLE

TECHNICAL FIELD

The present invention relates to actinic-radiation-curable resin compositions that have high storage stability and that combine high levels of ease of application and adhesion to various substrates and high levels of coating appearance and heat resistance after curing. The present invention also relates to actinic-radiation-curable resin compositions suitable for use as primers for the metallization of shaped articles made of a combination of different resins.

BACKGROUND ART

Substrates for articles such as reflectors for automotive exterior lamp lenses, which require high heat resistance, need to be metallized with metals such as aluminum and tin by processes such as vacuum evaporation and sputtering. Examples of substrates for use in such applications include plastic substrates and metal substrates, such as those made of bulk molding compounds (BMC), polyphenylene sulfides (PPS), aluminum die castings (ALD), polybutylene terephthalate (PBT)/polyethylene terephthalate (PET) alloy resins, polycarbonates (PC), acrylonitrile-butadiene-styrene copolymer (ABS) resins, and polycarbonates (PC) reinforced with fillers such as glass fibers. Recently, plastic substrates have been widely used because of their high heat resistance, their high impact resistance, and particularly, their low weight.

A problem exists, however, in that components manufactured by metallizing heat-resistant plastic substrates with metals such as aluminum tend to have low surface smoothness and lack metallic brightness. In particular, it is difficult to achieve the optical properties required for use as reflectors for automotive headlamp lenses. Accordingly, primers are applied to and cured on the surfaces of the substrates to form a coating layer before metallization to maintain the surface smoothness of the components and thereby achieve improved optical properties (see, for example, PTLs 1 to 4).

However, reflectors for automotive headlamp lenses are composed of a combination of different substrates. For example, whereas a substrate with high heat resistance is used for a portion close to the lamp light source, a substrate with high workability is used for a portion away from the lamp light source, where the shape of the substrate is complicated. To impart adhesion and heat resistance to these substrates, different primers have to be used depending on the type of substrate.

In addition to reflectors for automotive headlamp lenses, numerous metallic-looking components are used for various products to provide a superior design, including cellular phones, automotive parts such as grilles and emblems, cosmetic containers, and household electric appliances. These components are manufactured by forming shaped articles using a combination of various plastics and then metallizing the shaped articles with metals such as tin and aluminum by vacuum evaporation. To form a smooth surface and thereby increase the adhesion between the plastic substrate and the metallized film in this process, there is a need for an actinic-radiation-curable primer applicable to various plastic substrates.

CITATION LIST

Patent Literature

PTL 1: Domestic Re-publication of PCT International Publication for Patent Application No. 95/32250
PTL 2: Japanese Unexamined Patent Application Publication No. 2003-221408
PTL 3: Japanese Unexamined Patent Application Publication No. 2011-021153
PTL 4: Japanese Unexamined Patent Application Publication No. 2012-067162

SUMMARY OF INVENTION

Technical Problem

Accordingly, an object of the present invention is to provide an actinic-radiation-curable resin composition that has high storage stability and that combines high levels of ease of application and adhesion to various substrates and high levels of coating appearance and heat resistance after curing, an actinic-radiation-curable primer for metallization that contains such an actinic-radiation-curable resin composition, and a shaped article including an undercoat layer for metallization that has good adhesion to various substrates.

Solution to Problem

After conducting extensive research to solve the foregoing problems, the inventors have discovered that the foregoing problems can be solved by the use of an actinic-radiation-curable resin composition containing as essential components an oil-modified alkyd resin prepared using two or more particular oils and having a high molecular weight and a broad molecular weight distribution and a (meth)acryloyl-containing compound. This discovery has led to the present invention.

Specifically, the present invention provides an actinic-radiation-curable resin composition containing an oil-modified alkyd resin (A) and a (meth)acryloyl-containing compound (B). The oil-modified alkyd resin (A) is prepared using two or more oils (a1) having iodine values of 100 or more and has an oil length of 30 to 60, a mass average molecular weight of 200,000 to 1,000,000, and a molecular weight distribution (Mw/Mn) of 50 or more. The present invention further provides an actinic-radiation-curable primer for metallization that contains the actinic-radiation-curable resin composition and a shaped article including an undercoat layer made of the primer.

Advantageous Effects of Invention

The present invention provides an actinic-radiation-curable resin composition suitable for application to various plastic substrates and having high adhesion and storage stability. This composition provides a cured coating having a good appearance and high heat resistance. This composition is highly applicable to shaped articles having complicated shapes and shaped articles composed of a combination of different substrates and is suitable for use as a primer for metallization.

DESCRIPTION OF EMBODIMENTS

An actinic-radiation-curable resin composition according to the present invention contains an oil-modified alkyd resin (A) and a (meth)acryloyl-containing compound (B) as essential components. The oil-modified alkyd resin (A) is prepared using two or more oils (a1) having iodine values of 100 or more and has an oil length of 30 to 60, a mass average molecular weight of 200,000 to 1,000,000, and a molecular weight distribution (Mw/Mn) of 50 or more.

A typical oil-modified alkyd resin is prepared by condensation of a saturated polybasic acid and/or an unsaturated polybasic acid with a polyhydric alcohol using a drying oil, a semidrying oil, a nondrying oil, or a fatty acid present therein as a modifier. The oil-modified alkyd resin used in the present invention is prepared using two or more oils (a1) having iodine values of 100 or more and has a high molecular weight and a broad molecular weight distribution, i.e., an oil length of 30 to 60, a mass average molecular weight of 200,000 to 1,000,000, and a molecular weight distribution (Mw/Mn) of 50 or more. The use of such a resin improves the properties such as adhesion to various plastic substrates.

Examples of oils (a1) having iodine values of 100 or more include tung oil, linseed oil, dehydrated castor oil, soybean oil, safflower oil, and tall oil. Linseed oil, soybean oil, safflower oil, and tall oil are preferred, for example, for reasons of industrial availability and the adhesion of the resulting alkyd resin to substrates.

In the present invention, it is essential to use two or more oils (a1). The use of two or more oils (a1) provides an alkyd resin (A) having a broad molecular weight distribution and thus allows a composition having good adhesion to substrates and high sag resistance and suitable for application to be readily prepared. The use of two or more oils as stock materials, rather than the use of a mixture of alkyd resins synthesized as different alkyd resins, provides a homogeneous oil-modified alkyd resin and thus provides a homogeneous cured coating with a good coating appearance. The two or more oils (a1) may be used in any combination and in any mixing ratio, for example, depending on the target oil length of the resulting oil-modified alkyd resin (A).

It is also essential to use oils (a1) having iodine values of 100 or more. The use of such oils (a1) improves the curing reaction of a composition containing the resulting alkyd resin under actinic radiation and thus provides a coating with high heat resistance.

The oil-modified alkyd resin (A) used in the present invention, which, as described above, has a high molecular weight and a broad molecular weight distribution, is preferably prepared using a branched alkane polyol (a2) having three or more hydroxyl groups in the molecule thereof as a polyhydric alcohol and a polybasic acid (a3) having a cyclic unsaturated group in the molecule thereof. This allows a resin having the above properties to be readily prepared.

Examples of branched alkane polyols (a2) include aliphatic polyols such as trimethylolethane, trimethylolpropane, glycerol, hexanetriol, and pentaerythritol; modified polyether polyols prepared by ring-opening polymerization of the above aliphatic polyols with various cyclic ether-containing compounds such as ethylene oxide, propylene oxide, tetrahydrofuran, ethyl glycidyl ether, propyl glycidyl ether, and butyl glycidyl ether; and lactone polyester polyols prepared by the polycondensation reaction of the above aliphatic polyols with various lactones such as ε-caprolactone. Preferred branched alkane polyols include trimethylolethane, trimethylolpropane, pentaerythritol, and glycerol, which improve the crosslink density and thus provide a coating with high heat resistance and toughness.

Examples of polybasic acids (a3) include aromatic dicarboxylic acids such as phthalic acid (anhydride), terephthalic acid, isophthalic acid, and o-phthalic acid; and alicyclic dicarboxylic acids such as hexahydrophthalic acid and 1,4-cyclohexanedicarboxylic acid, which may be used alone or in combination.

Various monocarboxylic acids may be used in combination, for example, to control the molecular weight of the resulting alkyd resin (A). Monocarboxylic acids having a ring structure, such as benzoic acid, are preferred for reasons of the heat resistance and toughness of the resulting cured coating.

The oil-modified alkyd resin (A) may be manufactured in any manner. For example, the oil-modified alkyd resin (A) may be manufactured by reacting oils with an alcohol in the presence of a catalyst (esterification reaction or transesterification reaction) and then reacting the reaction product with an acid (esterification reaction), or by simultaneously introducing oils, an alcohol, and an acid as stock materials and reacting them together. The progress of the reaction can be monitored by measuring the amount of water produced by the dehydration reaction or by measuring the acid value or the hydroxyl value.

It is essential that the thus-prepared oil-modified alkyd resin (A) have an oil length of 30 to 60, preferably 40 to 50. The term "oil length" refers to the percentage of the mass of the oil components to the total mass of the alcohols, carboxylic acids, and unsaturated fatty acids and unsaturated fatty acid esters present in the oils used as stock materials. An oil-modified alkyd resin (A) having such an oil length provides a coating with a high ability to conform to substrates.

It is also essential that the oil-modified alkyd resin (A) used in the present invention have a mass average molecular weight (Mw) of 200,000 to U.S. Pat. No. 1,000,000 to achieve ease of application and good coating properties, preferably 300,000 to 600,000 to achieve a better coating appearance, e.g., better leveling properties. It is also essential that the oil-modified alkyd resin (A) have a molecular weight distribution (Mw/Mn), which is expressed as the ratio of the mass average molecular weight (Mw) to the number average molecular weight (Mn), of 50 or more, preferably 80 to 140, for reasons of the ability to conform to the profile of substrates and adhesion to various substrates.

The oil-modified alkyd resin (A) preferably has a hydroxyl value of 40 to 120, more preferably 50 to 90, to achieve good adhesion to various substrates.

In the present invention, various organic solvents may be added to the oil-modified alkyd resin (A). Examples of such organic solvents include ketones such as acetone, methyl ethyl ketone (MEK), and methyl isobutyl ketone; cyclic ethers such as tetrahydrofuran (THF) and dioxolane; esters such as methyl acetate, ethyl acetate, and butyl acetate; aromatic hydrocarbons such as toluene and xylene; and alcohols such as carbitol, cellosolve, methanol, isopropanol, butanol, and propylene glycol monomethyl ether. These organic solvents may be used alone or in combination.

The (meth)acryloyl-containing compound (B) used in the present invention may be any (meth)acryloyl-containing compound that can react with the oil-modified alkyd resin (A) to form a cured coating. Compounds having two or more (meth)acryloyl groups in a molecule thereof are preferred for reasons of crosslink density. Examples of such compounds include the following classes: (1) (meth)acrylate monomers prepared by reacting a polyol with (meth)acrylic acid, (2) urethane (meth)acrylates prepared by the addition reaction of a compound having a hydroxyl group and a (meth)acryloyl group with a compound having an isocyanate end group in the molecule thereof, (3) epoxy (meth)acrylates prepared by reacting a compound having at least two epoxy or glycidyl groups in the molecule thereof with (meth) acrylic acid, (4) polyester (meth)acrylates prepared by reacting with (meth)acrylic acid a polyester polyol prepared by polycondensation of a polyol with a polybasic acid or an anhydride thereof, and (5) acrylic acrylates containing acryloyl groups pendant to an acrylic copolymer of an acrylic monomer or a vinyl monomer.

Any polyol may be used for the (meth)acrylate monomers in class (1). Examples of polyols include ethylene glycol, diethylene glycol, triethylene glycol, propylene glycol, dipropylene glycol, polyethylene glycol, trimethylene glycol, polypropylene glycol, tetramethylene glycol, polytetramethylene glycol, 1,2-butanediol, 1,3-butanediol, 1,4-butanediol, 1,5-pentanediol, neopentyl glycol, 1,2-hexylene glycol, 1,6-hexanediol, heptanediol, 1,10-decanediol, cyclohexanediol, 2-butene-1,4-diol, 3-cyclohexene-1,1-dimethanol, 4-methyl-3-cyclohexene-1,1-dimethanol, 3-methylene-1,5-pentanediol, (2-hydroxyethoxy)-1-propanol, 4-(2-hydroxyethoxy)-1-butanol, 5-(2-hydroxyethoxy)-pentanol, 3-(2-hydroxypropoxy)-1-butanol, 4-(2-hydroxypropoxy)-1-butanol, 5-(2-hydroxypropoxy)-1-pentanol, 1-(2-hydroxyethoxy)-2-butanol, 1-(2-hydroxyethoxy)-2-pentanol, hydrogenated bisphenol A, glycerol, diglycerol, polycaprolactone, 1,2,6-hexanetriol, trimethylolpropane, trimethylolethane, pentanetriol, tris(hydroxymethyl)aminomethane, 3-(2-hydroxyethoxy)-1,2-propanediol, 3-(2-hydroxypropoxy)-1,2-propanediol, 6-(2-hydroxyethoxy)-1,2-hexanediol, 1,9-nonanediol, hydroxypivalic acid neopentyl glycol, spiroglycol, 2,2-bis(4-hydroxyethoxyphenyl)propane, 2,2-bis(4-hydroxypropyloxyphenyl)propane, pentaerythritol, dipentaerythritol, trimethylolpropane, tris(hydroxyethyl)isocyanurate, di(2-hydroxyethyl)-1-acetoxyethyl isocyanurate, di(2-hydroxyethyl)-2-acetoxyethyl isocyanurate, mannitol, and glucose. Other examples include alkylene oxide-modified polyols prepared by the addition reaction of the above polyols with alkylene oxides such as ethylene oxide and propylene oxide; lactone-modified polyols prepared by the addition reaction of the above polyols with lactones such as ε-caprolactone and γ-butyrolactone; polyester polyols, having hydroxyl end groups, that are prepared by condensation of excess polyol with a polybasic acid or an anhydride thereof; and polyether polyols.

Specific examples of such (meth)acrylate monomers include ethylene glycol di(meth)acrylate, diethylene glycol di(meth)acrylate, tetraethylene glycol di(meth)acrylate, polyethylene glycol di(meth)acrylate, propylene glycol di(meth)acrylate, dipropylene glycol di(meth)acrylate, polypropylene glycol di(meth)acrylate, butylene glycol di(meth)acrylate, neopentyl glycol di(meth)acrylate, ethylene oxide-modified bisphenol A di(meth)acrylate, propylene oxide-modified bisphenol A di(meth)acrylate, 1,6-hexanediol di(meth)acrylate, glycerol di(meth)acrylate, pentaerythritol di(meth)acrylate, ethylene glycol diglycidyl ether di(meth) acrylate, diethylene glycol diglycidyl ether di(meth)acrylate, diglycidyl phthalate di(meth)acrylate, and hydroxypivalic acid-modified neopentyl glycol di(meth)acrylate (difunctional (meth)acrylate monomers); and trimethylolpropane tri(meth)acrylate, pentaerythritol tri(meth)acrylate, pentaerythritol tetra(meth)acrylate, dipentaerythritol penta(meth)acrylate, dipentaerythritol hexa(meth)acrylate, tri(meth) acryloyloxyethoxytrimethylolpropane, and glycerol polyglycidyl ether poly(meth)acrylate (tri- and higher-functional (meth)acrylate monomers).

Examples of compounds having an isocyanate end group in the molecule thereof that can be used for the urethane (meth)acrylates in class (2) include polyisocyanates and reaction products thereof with the polyols listed above for the compounds in class (1).

Examples of polyisocyanates in class (2) include aliphatic, alicyclic, aromatic, and aromatic-aliphatic polyisocyanates. Examples of such polyisocyanates include diisocyanates such as tolylene diisocyanate, 4,4'-diphenylmethane diisocyanate, xylylene diisocyanate, hexamethylene diisocyanate, lysine diisocyanate, 4,4'-methylenebis(cyclohexyl isocyanate), methylcyclohexane-2,4-diisocyanate, methylcyclohexane-2,6-diisocyanate, 1,3-(isocyanatomethyl)cyclohexane, isophorone diisocyanate, trimethylhexamethylene diisocyanate, dimer acid diisocyanate, dianisidine diisocyanate, phenyl diisocyanate, halogenated phenyl diisocyanate, methylene diisocyanate, ethylene diisocyanate, butylene diisocyanate, propylene diisocyanate, octadecylene diisocyanate, 1,5-naphthalene diisocyanate, polymethylene polyphenylene diisocyanate, triphenylmethane triisocyanate, naphthylene diisocyanate, 3-phenyl-2-ethylene diisocyanate, cumene-2,4-diisocyanate, 4-methoxy-1, 3-phenylene diisocyanate, 4-ethoxy-1,3-phenylene diisocyanate, 2,4'-diisocyanate diphenyl ether, 5,6-dimethyl-1,3-phenylene diisocyanate, 4,4'-diisocyanate diphenyl ether, benzidine diisocyanate, 9,10-anthracene diisocyanate, 4,4'-diisocyanate dibenzyl, 3,3-dimethyl-4,4'-diisocyanate diphenyl, 2,6-dimethyl-4,4'-diisocyanate diphenyl, 3,3-dimethoxy-4,4'-diisocyanate diphenyl, 1,4-anthracene diisocyanate, phenylene diisocyanate, 1,4-tetramethylene diisocyanate, 1,10-decanemethylene diisocyanate, and 1,3-cyclohexylene diisocyanate; isocyanurates, biurets, and adducts thereof; and triisocyanates such as 2,4,6-tolylene triisocyanate and 2,4,4'-triisocyanate diphenyl ether.

Examples of compounds having a hydroxyl group and a (meth)acryloyl group for class (2) include pentaerythritol tri(meth)acrylate, dipentaerythritol penta(meth)acrylate, epoxy (meth)acrylate, 2-hydroxyethyl (meth)acrylate, glycerol di(meth)acrylate, alkylene oxide-modified compounds prepared by the addition reaction of the above compounds with alkylene oxides such as ethylene oxide and propylene oxide, and lactone-modified compounds prepared by the addition reaction of the above compounds with lactones such as ε-caprolactone and γ-butyrolactone. Compounds prepared by the addition reaction of the above compounds with polyisocyanates can also be used.

Examples of compounds having at least two epoxy or glycidyl groups in the molecule thereof for class (3) include glycidyl ether epoxy resins containing compounds such as bisphenol A, bisphenol F, 2,6-xylenol, brominated bisphenol A, and phenol novolac; glycidyl ester epoxy resins containing compounds such as dimer acid; glycidyl ester epoxy resins containing compounds such as aromatic and heterocyclic amines; alicyclic epoxy resins; and epoxy- or glycidyl-containing acrylic resins.

In particular, examples of compounds having three or more epoxy or glycidyl groups in the molecule thereof include glycerol triglycidyl ether, trimethylolpropane triglycidyl ether, sorbitol tetraglycidyl ether, sorbitol pentaglycidyl ether, sorbitan tetraglycidyl ether, sorbitan pentaglycidyl ether, triglycerol tetraglycidyl ether, tetraglycerol tetraglycidyl ether, pentaglycerol tetraglycidyl ether, triglycerol pentaglycidyl ether, tetraglycerol pentaglycidyl ether, pentaglycerol pentaglycidyl ether, pentaerythritol tetraglycidyl ether, and triglycidyl isocyanurate.

Examples of polyols and polybasic acids and anhydrides thereof for class (4) include those listed above.

In the present invention, (meth)acryloyl-containing compounds (B) such as those in classes (1) to (5) can be used.

These compounds are cured with actinic radiation through a polymerization reaction due to the presence of unsaturated bonds. Other compounds having an unsaturated bond, such as diallyl fumarate and triallyl isocyanurate, may also be present if necessary.

The oil-modified alkyd resin (A) and the (meth)acryloyl-containing compound (B) are preferably present in the actinic-radiation-curable resin composition according to the present invention in a mass ratio ((A)/(B)) of 20/80 to 80/20 to achieve good compatibility and to provide a coating with a good appearance. More preferably, the oil-modified alkyd resin (A) and the (meth)acryloyl-containing compound (B) are present in a mass ratio ((A)/(B)) of 70/30 to 30/70 to achieve good adhesion to substrates and to provide a tough coating.

The composition according to the present invention may contain a photoinitiator (C) to promote the curing reaction under actinic radiation. The photoinitiator (C) may be any photoinitiator that generates radicals when exposed to light. Examples of photoinitiators include 4-phenoxydichloroacetophenone, 4-t-butyl-dichloroacetophenone, diethoxyacetophenone, 2-hydroxy-2-methyl-1-phenylpropan-1-one, 1-(4-isopropylenephenyl)-2-hydroxy-2-methylpropan-1-one, 1-(4-dodecylphenyl)-2-hydroxy-2-methylpropan-1-one, 4-(2-hydroxyethoxy)-phenyl(2-hydroxy-2-propyl)ketone, 1-hydroxycyclohexyl phenyl ketone, 2-methyl-1-[4-(methylthio)phenyl]-2-morpholinopropane-1, benzoin, benzoin methyl ether, benzoin ethyl ether, benzoin isopropyl ether, benzoin isobutyl ether, benzyl dimethyl ketal, benzophenone, benzoylbenzoic acid, methyl benzoylbenzoate, 4-phenylbenzophenone, hydroxybenzophenone, 4-benzoyl-4'-methyl diphenyl sulfide, 3,3'-dimethyl-4-methoxybenzophenone, thioxanthone, 2-chlorothioxanthone, 2-methylthioxanthone, 2,4-dimethylthioxanthone, isopropylthioxanthone, camphorquinone, dibenzosuberone, 2-ethylanthraquinone, 4',4''-diethylisophthalophenone, 3,3', 4,4'-tetra(t-butylperoxycarbonyl)benzophenone, α-acyloxime esters, acylphosphine oxide, methylphenyl glyoxylate, benzil, 9,10-phenanthrenequinone, 4-(2-hydroxyethoxy) phenyl(2-hydroxy-2-propyl)ketone, dimethylaminobenzoic acid, and alkyl dimethylaminobenzoates. Preferred photoinitiators include benzyl dimethyl ketal, 1-hydroxycyclohexyl phenyl ketone, benzoyl isopropyl ether, 4-(2-hydroxyethoxy)-phenyl(2-hydroxy-2-propyl)ketone, 2-hydroxy-2-methyl-1-phenylpropan-1-one, dimethylaminobenzoic acid, and alkyl dimethylaminobenzoates, more preferably dimethylaminobenzoic acid and alkyl dimethylaminobenzoates.

Examples of commercially available photoinitiators (C) include Irgacure 184, 149, 261, 369, 500, 651, 754, 784, 819, 907, 1116, 1664, 1700, 1800, 1850, 2959, and 4043; Darocur 1173; Lucirin TPO (BASF); Kayacure DETX, MBP, DMBI, EPA, and OA (Nippon Kayaku Co., Ltd.); Vicure 10 and 55 (Stauffer Chemical); Trigonal P1 (Akzo); Sandoray 1000 (Sandoz); Deap (Apjohn); and Quantacure PDO, ITX, and EPD (Ward Blenkinsop). These photoinitiators may be used alone or in combination.

The photoinitiator is preferably present in an amount of 0.05 to 20 parts by mass, more preferably 0.1 to 10 parts by mass, per 100 parts by mass of the actinic-radiation-curable resin composition according to the present invention. This ensures good light sensitivity while avoiding problems such as crystallization and poor coating properties.

In addition to the above components, the actinic-radiation-curable resin composition according to the present invention may optionally contain an amino resin to provide a coating with a higher heat resistance.

Examples of amino resins include methylolated amino resins synthesized from at least one of melamine, urea, and benzoguanamine with formaldehyde and those in which some or all of the methylol groups are converted into an alkyl ether with lower monohydric alcohols such as methanol, ethanol, propanol, isopropanol, butanol, and isobutanol.

Examples of such amino resins include Cymel 303 (Nihon Cytec Industries, methylated melamine resin), Cymel 350 (Nihon Cytec Industries, methylated melamine resin), U-Van 520 (Mitsui Chemicals, Inc., n-butylated melamine resin), U-Van 20-SE-60 (Mitsui Chemicals, Inc., n-butylated melamine resin), U-Van 2021 (Mitsui Chemicals, Inc., n-butylated melamine resin), U-Van 220 (Mitsui Chemicals, Inc., n-butylated melamine resin), U-Van 22R (Mitsui Chemicals, Inc., n-butylated melamine resin), U-Van 2028 (Mitsui Chemicals, Inc., n-butylated melamine resin), U-Van 165 (Mitsui Chemicals, Inc., isobutylated melamine resin), U-Van 114 (Mitsui Chemicals, Inc., isobutylated melamine resin), U-Van 62 (Mitsui Chemicals, Inc., isobutylated melamine resin), and U-Van 60R (Mitsui Chemicals, Inc., isobutylated melamine resin).

The amino resin, when used, is preferably present in an amount of 5 to 20 parts by mass per 100 total parts by mass of the oil-modified alkyd resin (A) and the (meth)acryloyl-containing compound (B) in the composition.

The composition according to the present invention may further contain a solvent for dilution to facilitate coating. Although any solvent may be used, solvents with low surface tension are preferred to improve wettability. Examples of such solvents include alcohol solvents and ketone solvents. These solvents may be used in combination with other solvents such as ethyl acetate, butyl acetate, toluene, and xylene, for example, for reasons of evaporation rate and cost.

The composition according to the present invention may further contain a surface modifier. Any surface modifier may be used, including, for example, fluorine-based additives and cellulose-based additives. Fluorine-based additives, which decrease surface tension and thus increase wettability, prevent repelling on various substrates upon coating. Examples of fluorine-based additives include Megaface F-177 (DIC Corporation).

Cellulose-based additives impart film-forming properties upon coating. To decrease flowability, it is preferred to use cellulose-based additives having high molecular weights, i.e., number average molecular weights of 15,000 or more. Examples of such cellulose-based additives include cellulose acetate butyrate resins.

In the present invention, it is preferred to use a combination of a fluorine-based additive and a cellulose-based additive. The use of a large amount of fluorine-based additive would result in problems such as decreased adhesion to aluminum metallized films and topcoats. The use of a large amount of cellulose-based additive would decrease the solid content of the composition according to the present invention and thus decrease the adhesion of the coating.

The total amount of fluorine-based additive and cellulose-based additive is preferably 0.01 to 3.0 parts by mass per 100 total parts by mass of the nonvolatile components in the composition. If the fluorine-based additive is used alone, it is preferably present in an amount of 0.01 to 1.0 parts by mass. If the cellulose-based additive is used alone, it is preferably present in an amount of 0.5 to 5.0 parts by mass.

The actinic-radiation-curable resin composition according to the present invention may further contain various additives such as photosensitizers, UV absorbers, antioxidants, silicone-based additives, rheology control agents, defoaming agents, antistatic agents, and antifogging agents. These additives may be present in amounts sufficient to provide the effects of the additives, provided that they do not interfere with curing.

The actinic-radiation-curable resin composition according to the present invention is suitable for use as an actinic-radiation-curable primer for metallization. Specifically, the actinic-radiation-curable resin composition according to the present invention is used to form an undercoat layer on a substrate on which a metallized layer is to be formed. The conditions where the actinic-radiation-curable resin composition according to the present invention is used to form an undercoat layer on a substrate on which a metallized layer is to be formed will now be described in detail.

To form an undercoat layer, the actinic-radiation-curable resin composition according to the present invention is applied to a substrate by a process such as spray coating. The composition is preferably applied such that the thickness after curing is 5 to 60 μm, more preferably 10 to 40 μm. A cured coating having such a thickness is preferred in terms of adhesion effect and coating curability.

The actinic-radiation-curable resin composition applied to the substrate as described above is preheated at 50° C. to 150° C. for 5 to 25 minutes to evaporate the organic solvent from the resin composition.

After the preheating step is complete, the resin composition is cured by irradiation with actinic radiation to form an undercoat layer. Examples of actinic radiation for use in the present invention include UV radiation and electron beams. For example, the resin composition may be cured with UV radiation from a UV irradiation system equipped with a light source such as a xenon lamp, a high-pressure mercury lamp, or a metal halide lamp. The settings of the irradiation system, such as light intensity and the placement of the light source, are adjusted if necessary. In the present invention, the resin composition is preferably irradiated with UV radiation to a cumulative dose of 50 to 5,000 mJ/cm$^2$, more preferably 500 to 2,000 mJ/cm$^2$.

The substrate on which the undercoat layer according to the present invention is formed as described above is coated with a metallized layer and then with, for example, a topcoat layer. The metallized layer preferably has a thickness of 30 nm to 3 μm. The topcoat layer preferably has a thickness of 3 to 40 μm after curing. In this way, shaped articles such as automotive reflectors can be manufactured. The use of the actinic-radiation-curable resin composition according to the present invention to form an undercoat layer for a metallized layer provides a shaped article coated with a metallized layer having a metallic gloss, good adhesion to the substrate, and high heat resistance. The actinic-radiation-curable resin composition according to the present invention also has the advantage of high storage stability.

EXAMPLES

The present invention is further illustrated by the following specific Synthesis Examples and Examples, where parts and percentages are by mass unless otherwise specified.
Method for Measuring Mass Average Molecular Weight (Mw) and Molecular Weight Distribution (Mw/Mn)
The mass average molecular weight (Mw) and the molecular weight distribution (Mw/Mn) were measured by gel permeation chromatography (GPC) under the following conditions.
Measurement system: Tosoh HLC-8220 GPC
Columns: Tosoh TSK-Guard Column Super HZ-L+Tosoh TSK-Gel Super HZM-M×4
Detector: differential refractive index (RI) detector
Data processing: Tosoh Multistation GPC-8020 Model II
Measurement conditions:
Column temperature: 40° C.
Solvent: tetrahydrofuran
Flow rate: 0.35 mL/min
Standards: monodisperse polystyrene standards
Sample: 0.2% (solid basis) solution of resin in tetrahydrofuran filtered through microfilter (100 μL)

Synthesis Example 1

Into a flask equipped with a stirrer bar, a temperature sensor, a fractionating column, and a decanter were placed 380 parts of soybean oil, 890 parts of safflower oil, 154 parts of p-tert-butylbenzoic acid, 472 parts of pentaerythritol, 754 parts of phthalic anhydride, 56 parts of xylene, and 0.2 part of an organotitanium compound. The mixture in the flask was heated to 220° C. to 240° C. with stirring in a dry nitrogen flow to perform a dehydration condensation reaction. The reaction was terminated when the acid value reached 12 mg KOH/g or less. After the reaction mixture was allowed to cool to 150° C., a mixture of toluene and ethyl acetate was added dropwise to a solid content of 50%. The resulting alkyd resin had a number average molecular weight of 4,000, a mass average molecular weight of 530,000, a hydroxyl value of 70, an acid value of 12, and an oil length of 50. This resin is referred to as Alkyd Resin (A1).

Synthesis Example 2

Into a flask equipped with a stirrer bar, a temperature sensor, a fractionating column, and a decanter were placed 63 parts of soybean oil, 1,198 parts of linseed oil, 560 parts of pentaerythritol, 287 parts of benzoic acid, 830 parts of phthalic anhydride, 83 parts of xylene, and 0.3 part of an organotitanium compound. The mixture in the flask was heated to 220° C. to 240° C. with stirring in a dry nitrogen flow to perform a dehydration condensation reaction. The reaction was terminated when the acid value reached 10 mg KOH/g or less. After the reaction mixture was allowed to cool to 150° C., a mixture of toluene and ethyl acetate was added dropwise to a solid content of 50%. The resulting alkyd resin had a number average molecular weight of 3,700, a mass average molecular weight of 300,000, a hydroxyl value of 84, an acid value of 10, and an oil length of 45. This resin is referred to as Alkyd Resin (A2).

Synthesis Example 3

Into a flask equipped with a stirrer bar, a temperature sensor, a fractionating column, and a decanter were placed 750 parts of linseed oil, 600 parts of tall oil, 282 parts of pentaerythritol, 345 parts of trimethylolpropane, 314 parts of benzoic acid, 846 parts of phthalic anhydride, 89 parts of xylene, and 0.3 part of an organotitanium compound. The mixture in the flask was heated to 220° C. to 240° C. with stirring in a dry nitrogen flow to perform a dehydration condensation reaction. The reaction was terminated when the acid value reached 13 mg KOH/g or less. After the reaction mixture was allowed to cool to 150° C., a mixture of toluene and ethyl acetate was added dropwise to a solid content of 50%. The resulting alkyd resin had a number average molecular weight of 3,600, a mass average molecular weight of 410,000, a hydroxyl value of 51, an acid value of 11, and an oil length of 45. This resin is referred to as Alkyd Resin (A3).

Resin for Comparison: Acrylic Resin (X)

"Acrydic 56-393-BA" (DIC Corporation, styrene content: 20 parts per 100 parts of monomer mixture, glass transition temperature: 5° C.) was used. This resin is referred to as Acrylic Resin (X).

Synthesis of Alkyd Resin (Y1) for Comparison

Into a flask equipped with a stirrer bar, a temperature sensor, and a condenser were placed 1,000 parts of "Beckosol OD-E-198-50" (DIC Corporation, oil length: 28, type of oil: soybean oil) and 0.7 part of isophorone diisocyanate. The mixture in the flask was heated to 70° C. to 90° C. with stirring in a dry nitrogen flow to perform a urethanization reaction. The reaction was terminated when the isocyanate content reached 0.02% or less. After the reaction mixture was allowed to cool to 60° C., xylene was added dropwise to a solid content of 50%. The resulting urethane-modified alkyd resin had a number average molecular weight of 3,900, a mass average molecular weight of 170,000, and a molecular weight distribution (Mw/Mn) of 43.6. This resin is referred to as Alkyd Resin (Y1).

Alkyd Resin (Y2) for Comparison

"Beckosol 1323-60EL" (DIC Corporation, oil length: 28, type of oil: coconut oil) was used. This resin is referred to as Alkyd Resin (Y2).

Alkyd Resin (Y3) for Comparative Examples

Into a flask equipped with a stirrer bar, a temperature sensor, a fractionating column, and a decanter were placed 1,412 parts of soybean oil, 259 parts of neopentyl glycol, 445.6 parts of trimethylolpropane, 276 parts of adipic acid, 559 parts of phthalic anhydride, 90 parts of xylene, and 0.3 part of an organotitanium compound. The mixture in the flask was heated to 220° C. to 240° C. with stirring in a dry nitrogen flow to perform a dehydration condensation reaction. The reaction was terminated when the acid value reached 8 mg KOH/g or less. After the reaction mixture was allowed to cool to 150° C., a mixture of toluene and ethyl acetate was added dropwise to a solid content of 50%. The resulting alkyd resin had a number average molecular weight of 3,800, a mass average molecular weight of 310,000, a hydroxyl value of 78, an acid value of 8, and an oil length of 50. This resin is referred to as Alkyd Resin (Y3).

Alkyd Resin (Y4) for Comparative Examples

Into a flask equipped with a stirrer bar, a temperature sensor, a fractionating column, and a decanter were placed 1,269 parts of linseed oil, 593 parts of pentaerythritol, 880 parts of phthalic anhydride, 60 parts of xylene, and 0.3 part of an organotitanium compound. The mixture in the flask was heated to 220° C. to 240° C. with stirring in a dry nitrogen flow to perform a dehydration condensation reaction. The reaction was terminated when the acid value reached 5.1 mg KOH/g or less. After the reaction mixture was allowed to cool to 150° C., a mixture of toluene and ethyl acetate was added dropwise to a solid content of 50%. The resulting alkyd resin had a number average molecular weight of 3,800, a mass average molecular weight of 303,000, a hydroxyl value of 41, an acid value of 5.1, and an oil length of 45. This resin is referred to as Alkyd Resin (Y4).

Preparation of Actinic-Radiation-Curable Resin Compositions

Liquid compositions were prepared by mixing stock materials in the ratios (by mass) shown in Table 1 on a solid basis. The compositions were prepared using the following stock materials:

Unidic V-4025: urethane acrylate (DIC Corporation) Kayarad DPHA: mixture of dipentaerythritol pentaacrylate and dipentaerythritol hexaacrylate (Nippon Kayaku Co., Ltd.)

Aronix M-305: mixture of pentaerythritol triacrylate and pentaerythritol tetraacrylate (Toagosei Co., Ltd.)

NK-Ester APG-200: tripropylene glycol diacrylate (Shin Nakamura Chemical Co., Ltd.)

Cymel 303: melamine resin (Nihon Cytec Industries)

Cymel 307: melamine resin (Nihon Cytec Industries)

Irgacure 651: photoinitiator (BASF)

Kayacure DETX-S: photoinitiator (Nippon Kayaku Co., Ltd.)

Irgacure 184: photoinitiator (BASF)

Megaface F-477: surface modifier (DIC Corporation)

Evaluation of Storage Stability

The resulting compositions were stored at 40° C. for 3 months. Thereafter, the compositions were visually examined for storage stability and were evaluated according to the following criteria. The results are summarized in Table 1.

Good: the composition exhibited little change in viscosity and did not gel.

Fair: the composition exhibited an increase in viscosity, but did not gel and was applicable to coating.

Poor: the composition exhibited a noticeable increase in viscosity and was not applicable to coating, or gelled.

Fabrication of Reflectors

Bulk molding compound (BMC), polyphenylene sulfide (PPS), polybutylene terephthalate (PBT)/polyethylene terephthalate (PET) alloy, and polycarbonate (PC) substrates were used.

These substrates were coated with the compositions prepared in advance by air spraying. The coated substrates were dried at 80° C. for 10 minutes to remove the solvent and were irradiated with UV radiation from a 80 W/cm high-pressure mercury lamp to a dose of 1,000 mJ/cm$^2$ to form a primer layer (undercoat layer) having a thickness of 10 to 15 μm on the substrates.

The resulting undercoat layer was metallized with aluminum by vacuum evaporation. The aluminum layer was then coated with a topcoat containing 20 parts of U-Pica Coat 3002A (Japan U-Pica Company Ltd.), 35 parts of toluene, 40 parts of Solvesso #100, and 5 parts of n-butanol by air spraying. The topcoat was baked at 120° C. for 10 minutes to form a protective coating having a thickness of 3 to 5 μm. In this way, reflectors were fabricated. A reflector including a BMC substrate is referred to as "Reflector 1". A reflector including a PPS substrate is referred to as "Reflector 2". A reflector including a PBT/PET alloy substrate is referred to as "Reflector 3". A reflector including a PC substrate is referred to as "Reflector 4".

Reflector 1 was evaluated for smoothness after fabrication, after a heat resistance test, and after a moisture resistance test. Reflectors 1 to 4 were evaluated for appearance and adhesion after fabrication, after the heat resistance test, and after the moisture resistance test. The results are summarized in Table 1.

Evaluation of Smoothness

The reflectors were visually evaluated for smoothness according to the following criteria:

Good: the coating exhibited no sagging or orange peel and was smooth.

Fair: the coating exhibited slight and tolerable sagging or orange peel.

Poor: the coating exhibited noticeable sagging or orange peel.

Evaluation of Appearance

The reflectors were visually evaluated for appearance according to the following criteria:

Good: the coating had no defects such as cracking, blistering, or fogging.

Fair: the coating had slight defects such as cracking, blistering, or fogging.

Poor: the coating had noticeable defects such as cracking or blistering.

Evaluation of Adhesion

The protective coatings on the reflectors were cross-cut with a cutter knife to form a grid of 10×10 squares, each having a size of 2 mm×2 mm. A cellophane adhesive tape was applied to the grid and was rapidly removed therefrom. The number of squares remaining without being removed was counted and evaluated according to the following criteria:

Good: 100 squares remained.

Fair: 91 to 99 squares remained.

Poor: 90 or fewer squares remained.

Heat Resistance Test Method

Reflectors 1 to 4 were placed in a hot-air drying oven at the following temperatures and were left standing for 96 hours. Thereafter, the reflectors were evaluated for appearance and adhesion.

Reflector 1: 180° C.

Reflector 2: 230° C.

Reflector 3: 200° C.

Reflector 4: 120° C.

Evaluation of Moisture Resistance

Reflector 1 was left standing in a constant temperature/humidity chamber at a temperature of 50° C. and a humidity of 95% RH for 240 hours. Thereafter, the reflector was evaluated for appearance and adhesion.

TABLE 1

| | | Example 1 | Example 2 | Example 3 | Example 4 | Example 5 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|
| Composition | Resin | | | | | | | | | | | |
| | Alkyd resin (A1) | 60 | | | 40 | 60 | | | | | | |
| | Alkyd resin (A2) | | 60 | | | | | | | | | |
| | Alkyd resin (A3) | | | 60 | | | | | | | | |
| | Acrylic resin (X) | | | | | | 60 | | | | | |
| | Alkyd resin (Y1) | | | | | | | 60 | | | | |
| | Alkyd resin (Y2) | | | | | | | | 60 | | | |
| | Alkyd resin (Y3) | | | | | | | | | 60 | | |
| | Alkyd resin (Y4) | | | | | | | | | | 60 | 30 |
| | Unidic V-4025 | | | | | | | | | | | 30 |
| (Meth)acryloyl-containing compound (B) | Kayarad DPHA | 15 | 10 | 15 | 15 | 15 | 15 | 15 | 15 | 15 | 15 | 15 |
| | Aronix M-305 | 10 | 10 | 10 | 15 | 10 | 10 | 10 | 10 | 10 | 10 | 10 |
| | NK-Ester APG-200 | 5 | 5 | 5 | 20 | 5 | 5 | 5 | 5 | 5 | 5 | 5 |
| Amino resin | Cymel 303 | 10 | 10 | 10 | 5 | 10 | 10 | 10 | 10 | 10 | 10 | 10 |
| | Cymel 307 | | | | 5 | | | | | | | |
| Photoinitiator (C) | Irgacure 651 | 1 | 1 | 1 | 1 | 0.8 | 1 | 1 | 1 | 1 | 1 | 1 |
| | Kayacure DETX-S | 0.5 | 0.5 | 0.5 | 0.5 | 0.4 | 0.5 | 0.5 | 0.5 | 0.5 | 0.5 | 0.5 |
| | Irgacure 184 | | | | | 0.3 | | | | | | |
| | Surface modifier Megaface F-477 | 0.5 | 0.5 | 0.5 | 0.5 | 0.5 | 0.5 | 0.5 | 0.5 | 0.5 | 0.5 | 0.5 |
| Initial evaluation | Reflector 1 Smoothness | Good | Good | Good | Good | Good | Fair | Good | Good | Good | Fair | Fair |
| | Appearance | Good | Good | Good | Good | Good | Good | Fair | Good | Good | Good | Good |
| | Adhesion | Good | Good | Good | Good | Good | Good | Good | Good | Fair | Good | Fair |
| | Reflector 2 Appearance | Good | Good | Good | Good | Good | Good | Good | Good | Good | Good | Good |
| | Adhesion | Good | Good | Good | Fair | Good | Fair | Fair | Poor | Fair | Fair | Fair |
| | Reflector 3 Appearance | Good | Good | Good | Good | Good | Good | Good | Fair | Fair | Good | Good |
| | Adhesion | Good | Good | Good | Good | Good | Fair | Good | Fair | Poor | Fair | Poor |
| | Reflector 4 Appearance | Good | Good | Fair | Good | Good | Fair | Fair | Fair | Fair | Fair | Fair |
| | Adhesion | Fair | Good | Good | Good | Fair | Good | Good | Poor | Poor | Good | Good |
| After heat resistance test | Reflector 1 Appearance | Good | Good | Good | Good | Good | Fair | Good | Poor | Fair | Good | Good |
| | Adhesion | Good | Good | Good | Good | Good | Good | Fair | Fair | Fair | Fair | Poor |
| | Reflector 2 Appearance | Good | Good | Good | Fair | Good | Fair | Good | Poor | Poor | Good | Poor |
| | Adhesion | Good | Good | Good | Good | Good | Good | Poor | Poor | Poor | Poor | Poor |
| | Reflector 3 Appearance | Good | Good | Good | Good | Good | Poor | Poor | Poor | Fair | Poor | Fair |
| | Adhesion | Good | Good | Good | Fair | Good | Poor | Poor | Poor | Poor | Poor | Poor |
| | Reflector 4 Appearance | Good | Good | Good | Good | Good | Fair | Fair | Fair | Fair | Fair | Fair |
| | Adhesion | Good | Good | Good | Fair | Good | Good | Good | Fair | Good | Good | Good |
| After heat and moisture resistance test | Reflector 1 Appearance | Good | Good | Good | Good | Fair | Fair | Good | Poor | Poor | Fair | Fair |
| | Adhesion | Good | Good | Good | Good | Good | Good | Poor | Poor | Poor | Fair | Poor |
| | Reflector 2 Appearance | Good | Good | Good | Fair | Good | Fair | Poor | Fair | Fair | Fair | Fair |
| | Adhesion | Good | Good | Good | Good | Good | Good | Poor | Poor | Fair | Fair | Poor |
| | Reflector 3 Appearance | Good | Fair | Good | Fair | Good | Fair | Poor | Poor | Fair | Good | Fair |
| | Adhesion | Good | Good | Good | Good | Good | Poor | Poor | Poor | Fair | Fair | Fair |
| | Reflector 4 Appearance | Good | Good | Good | Good | Fair | Good | Poor | Poor | Poor | Good | Good |
| | Adhesion | Good | Good | Good | Good | Good | Poor | Poor | Fair | Fair | Poor | Poor |
| Evaluation of storage stability | | Good | Good | Good | Good | Good | Good | Poor | Good | Good | Good | Good |

The invention claimed is:

1. An actinic-radiation-curable resin composition comprising an oil-modified alkyd resin (A) and a compound (B) having two or more (meth)acryloyl groups in a molecule thereof,
the oil-modified alkyd resin (A) being prepared using two or more oils (a1) having iodine values of 100 or more, the oil-modified alkyd resin (A) having an oil length of 30 to 60, a mass average molecular weight of 200,000 to 1,000,000, and a molecular weight distribution (Mw/Mn) of 50 or more,
the oil-modified alkyd resin (A) and the (meth)acryloyl-containing compound (B) being present in a mass ratio ((A)/(B)) of 20/80 to 80/20.

2. The actinic-radiation-curable resin composition according to claim 1, wherein the oils (a1) having an iodine value of 100 or more are selected from the group consisting of linseed oil, soybean oil, safflower oil, and tall oil.

3. The actinic-radiation-curable resin composition according to claim 1, wherein the oil-modified alkyd resin (A) is prepared further using a branched alkane polyol (a2) having three or more hydroxyl groups in a molecule thereof and a polybasic acid (a3) having a cyclic unsaturated group in a molecule thereof.

4. The actinic-radiation-curable resin composition according to claim 1, wherein the (meth)acryloyl-containing compound (B) is at least one compound selected from the group consisting of (meth)acrylate monomers, urethane (meth)acrylates, epoxy (meth)acrylates, polyester (meth)acrylates, and acrylic acrylates.

5. The actinic-radiation-curable resin composition according to claim 1, further comprising an amino resin.

6. The actinic-radiation-curable resin composition according to claim 5, wherein the amino resin is present in an amount of 5 to 20 parts by mass per 100 total parts by mass of the oil-modified alkyd resin (A) and the (meth)acryloyl-containing compound (B).

7. The actinic-radiation-curable resin composition according to claim 1, further comprising a photoinitiator (C).

8. An actinic-radiation-curable primer for metallization comprising the actinic-radiation-curable resin composition according to claim 1.

9. A shaped article comprising an undercoat layer comprising the primer according to claim 8.

* * * * *